April 3, 1934.  A. S. FITZ GERALD  1,953,800
PROTECTION OF ELECTRIC CIRCUITS
Filed May 12, 1931

Inventor:
Alan S. FitzGerald.
by Chas V Mullen
His Attorney.

Patented Apr. 3, 1934

1,953,800

UNITED STATES PATENT OFFICE 1,953,800

PROTECTION OF ELECTRIC CIRCUITS

Alan S. Fitz Gerald, Wynnewood, Pa., assignor to General Electric Company, a corporation of New York Application May 12, 1931, Serial No. 536,818

7 Claims. (Cl. 175—294)

My invention relates to improvements in the protection of electric circuits and more particularly to improvements in protective arrangements such as are disclosed in United States Letters Patent No. 1,797,976, issued March 24, 1931. An object of my invention is to provide a simple and positive relay interlocking arrangement for controlling circuit interrupting devices in accordance with electrical conditions of a circuit at two points thereof whereby to insure effective circuit controlling action without sacrificing speed of operation.

My invention will be better understood from the following description when considered in connection with the accompanying drawing and its scope will be pointed out in the appended claims.

Figure 1:
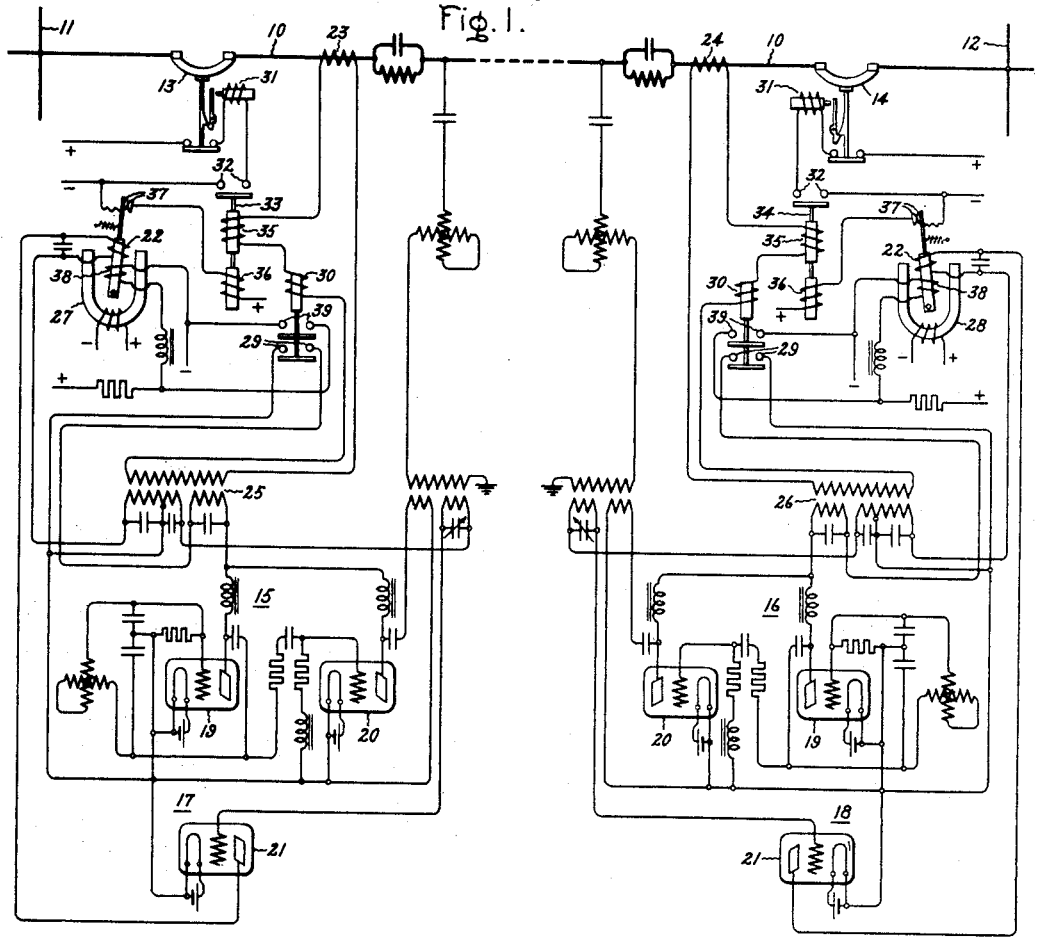
Figure 2:
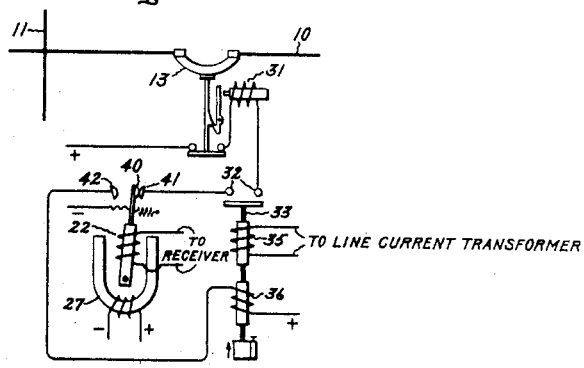

In the accompanying drawing, Fig. 1 illustrates, in single phase diagram for clearness, an embodiment of my invention and Fig. 2 illustrates diagrammatically a modification of my invention.

As disclosed in the patent previously referred to, there are located at each of two points of a circuit 10 such as adjacent station buses 11, 12 suitable circuit interrupting means shown as circuit breakers 13 and 14 and controlling means therefor including oscillation transmitters 15, 16 and receivers 17, 18. These are suitably coupled to the circuit 10 which may be a power line and are shown as of the electric discharge valve type, each transmitter being illustrated as including an oscillator valve 19 and an amplifying valve 20 and each receiver as including a detector valve 21. The receiver at each point is tuned to the frequency of the transmitter at the other point. Also as disclosed in the patent referred to, the transmitters and receivers are keyed to the circuit 10 at the respective points by means which suitably reflect circuit conditions at the points, such as current transformers 23, 24 and excitation transformers 25, 26.

The connection and arrangement of parts as pointed out in the patent is such that the transmitters and receivers operate only on alternate half cycles of circuit current at the respective points and such that on the occurrence of a fault on the circuit external to the section between the buses, the transmitters transmit alternately but on a fault in the section simultaneously, while the receivers can receive from the respective transmitters only when they are transmitting alternately. Each receiver 17, 18 thus controls an associated receiver relay 27, 28 through the winding 22 thereof in the receiver output circuit in accordance with the relative directions of the circuit current at two points. The transmitters 15, 16 may be normally inoperative and have plate voltages applied thereto only on the occurrence of predetermined circuit conditions through the contacts 29 of an overcurrent starting relay 30.

As shown, the circuit breakers 13, 14 are of the latched closed type each having a trip coil 31 which is arranged to be controlled on the occurrence of abnormal circuit conditions in accordance with the relative directions of the circuit current at two points of the circuit. For this purpose I provide, in accordance with my invention, relay means 33, 34 having a plurality of opposing windings 35, 36 of which 35 is connected to be energized from the circuit 10 while the energization of another winding 36 is controlled by the respectively associated receiver relays 27, 28. As illustrated, the windings 35 and 36 are substantially magnetically independent of each other. The relay means 33, 34 may be of the overcurrent type shown but it will be apparent to those skilled in the art that any suitable protective relay which operates in response to abnormal circuit conditions may be employed. If the protective relays 33, 34 are of the overcurrent type shown, they may be set so as to tend to pick up and close their contacts 32 in the circuits of the trip coils 31 at some predetermined value of current which will, in general, be greater than that for which the starting relays 30 are set to operate.

In order to prevent the operation of the relays 33, 34 for faults outside the section between the buses 11 and 12, the receiver relays 27, 28 are arranged to maintain the circuits of the restraining windings 36 of the respective protective relays 33, 34 closed through relatively movable contacts 37. For this purpose, the receiver relays 27, 28 may be of the polarized type shown with the movable contact member spring biased to the open circuit position but normally maintained in the closed position by a holding winding 38 whose energization is under the control, for example, of the contacts 39 of the starting relay 30 and which, as shown, may be short-circuited thereby when this relay operates. The winding 22 of the receiver relays 27 and 28 likewise when energized tends to work against the spring bias of the movable contact to maintain the contacts 37 closed.

If a fault occurs on the circuit 10 outside the section between the station buses 11, 12, then, as disclosed in the patent previously referred to, both transmitters 15 and 16 will transmit alternately and energize their respective receivers 18 and 17 which, under these conditions, are operated to receive alternately from their respective transmitters. Consequently, although the protective relays 33, 34 may tend to close their contacts 32, they will be prevented from so doing because the winding 22 of each of the receiver relays 27, 28 will be energized and oppose the spring bias even though the starting relays have operated to short-circuit the receiver relay windings 38. Therefore the restraining winding 36 remains energized. If, however, the fault is between the buses 11 and 12, then, as pointed out in the patent, the transmitters transmit simultaneously and at times when the receivers cannot receive. Consequently, the deenergization of the receiver relay winding 38, due to the operation of the starting relay 30, results in the spring bias opening the contacts 37 in the circuit of the restraining winding 36 of the protective relay because the winding 22 of the receiver relay is not energized. Therefore, the protective relays 33, 34 are free to operate and close their contacts 32 under the action of the current energized winding 35. The closing of the contacts 32 completes the circuits of the trip coils 31 whereby to disconnect the faulty section of the circuit.

In the modification of my invention shown in Fig. 2, I have illustrated, for the sake of simplicity, only so much of the apparatus at one station as differs from the arrangement shown in Fig. 1. In this modification the receiver relay 27 is of the double-throw type and is spring-biased to have its movable contact 40 engage the stationary contact 41 when the receiver relay winding 22 is deenergized, the contacts 40, 41 being in series with the contacts 32 of the protective relay 33 in the circuit of the trip coil 31. When the receiver relay winding 22 is energized as in case of a fault outside the section to be protected, then the movable contact 40 engages the stationary contact 42 whereby to complete the circuit of the restraining winding 36 of the protective relay 33 so as to prevent the operation thereof merely in response to current alone. In order to allow for the slight time of operation of the high speed receiver relay 27 to close its contacts 40, 42, the protective relay 33 may be provided with a time element, as shown. When the fault is within the section, the receiver relay winding 22 is not energized and the protective relay closes its contacts 32 thereby completing the circuit of the trip coil 31 and effecting the disconnection of the faulty section.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination, an electric circuit, circuit interrupting means therefor, and means for controlling said circuit interrupting means including relay means having two substantially magnetically independent opposing windings, one of said windings being connected to be energized from said circuit and means for controlling the energization of the other of said windings in accordance with the relative directions of the circuit current at two points of the circuit.

2. In combination, an electric circuit, circuit interrupting means therefor and means for controlling said circuit interrupting means including an oscillation transmitter at one point of the circuit, a receiver tuned to the frequency of said transmitter at another point of the circuit, a relay having two opposing windings, one of said windings being connected to be energized from the circuit and means controlled by said receiver for controlling the energization of the other winding of said relay.

3. In combination, an electric circuit, circuit interrupting means therefor and means for controlling said circuit interrupting means including an oscillation transmitter at one point of the circuit, a receiver tuned to the frequency of said transmitter at another point of the circuit, relay means having an operating winding connected to be energized in accordance with the circuit current at the receiver location and a restraining winding for opposing the effect of said operating winding, and a relay having a winding connected to be controlled by said receiver for controlling the energization of said restraining winding.

4. In combination, an electric circuit, circuit interrupting means therefor, means for controlling the opening of said circuit interrupting means including relay means having an operating winding connected to be energized in accordance with the circuit current and a restraining winding for opposing the effect of said operating winding and means including a relay for controlling the energization of said restraining winding in accordance with the relative directions of the circuit current at two points of the circuit.

5. In combination, an electric circuit, circuit interrupting means therefor and means for controlling said circuit interrupting means including an oscillation transmitter at one point of the circuit, a receiver tuned to the frequency of said transmitter at another point of the circuit, a relay having two opposing windings, one of said windings being connected to be energized from the circuit and means controlled by said receiver for causing the deenergization of the other winding of said relay on the occurrence of a fault on the circuit between the points at which said transmitter and receiver are located.

6. In combination, an electric circuit, circuit interrupting means at two points of said circuit, means for controlling said circuit interrupting means to effect the opening thereof on the occurrence of a fault on the circuit between the two points including an oscillation transmitter at each point, a receiver at each point, the receiver at one point being tuned to the frequency of the transmitter at the other point, a protective relay a each point having two opposing windings, one of said windings being connected to be energized in accordance with the circuit current at the relay location and relay means at each point controlled by the receiver at the point for preventing the other winding of the protective relay from exerting an opposing effect on the occurrence of a fault on the circuit between the two points.

7. In combination, an electric circuit, circuit interrupting means therefor and means for controlling said circuit interrupting means including relay means having two opposing windings one of said windings being connected to be energized from said circuit and means for controlling the circuit of the other of said windings operative to effect the energization thereof in response to a predetermined relation between the currents at two points of the circuit.

ALAN S. FITZ GERALD.